United States Patent [19]

Watkins

[11] Patent Number: 5,441,311
[45] Date of Patent: Aug. 15, 1995

[54] CONNECTOR WITH OPPOSITE MOVING CAM RINGS

[75] Inventor: Bruce J. Watkins, Houston, Tex.

[73] Assignee: Dril-Quip, Inc., Houston, Tex.

[21] Appl. No.: 269,550

[22] Filed: Jul. 1, 1994

[51] Int. Cl.⁶ .................. F16L 55/00; F16L 37/18; F16L 39/00

[52] U.S. Cl. .................. 285/18; 285/315; 285/341; 285/309; 285/321

[58] Field of Search .............. 285/18, 315, 341, 309, 285/321, 39, 419, 398, 373

[56] References Cited

U.S. PATENT DOCUMENTS

| | | |
|---|---|---|
| 4,491,346 | 1/1985 | Walker . |
| 4,496,172 | 1/1985 | Walker . |
| 4,526,406 | 7/1985 | Nelson .................. 285/18 |
| 4,557,508 | 12/1985 | Walker .................. 285/315 |
| 4,856,594 | 8/1989 | Jennings .................. 285/18 |
| 4,902,044 | 2/1990 | Williams et al. .................. 285/18 |
| 5,135,266 | 8/1992 | Bridges et al. .................. 285/341 |
| 5,255,743 | 6/1993 | Adam et al. .................. 285/18 |
| 5,265,917 | 11/1993 | Hitz .................. 285/315 |

FOREIGN PATENT DOCUMENTS 2010427  6/1979  United Kingdom .................. 285/18

*Primary Examiner*—Eric K. Nicholson
*Attorney, Agent, or Firm*—Vaden, Eickenroht, Thompson and Feather

[57] ABSTRACT

There is disclosed a connector for releasably connecting tubular members connected to adjacent ends of riser pipes in end-to-end relation. The tubular members have locking grooves about their adjacent ends, and a split lock ring surrounds the adjacent ends of the tubular members, when in end-to-end relation, and has upper and lower teeth thereabout for fitting tightly within the grooves to hold the ends of the tubular members in end-to-end relation. The lock ring is moved between locking and unlocking positions by means of cam rings having tapered conical cam surfaces thereabout for slidable engagement with follower surfaces about the upper and lower ends of the lock ring.

10 Claims, 4 Drawing Sheets

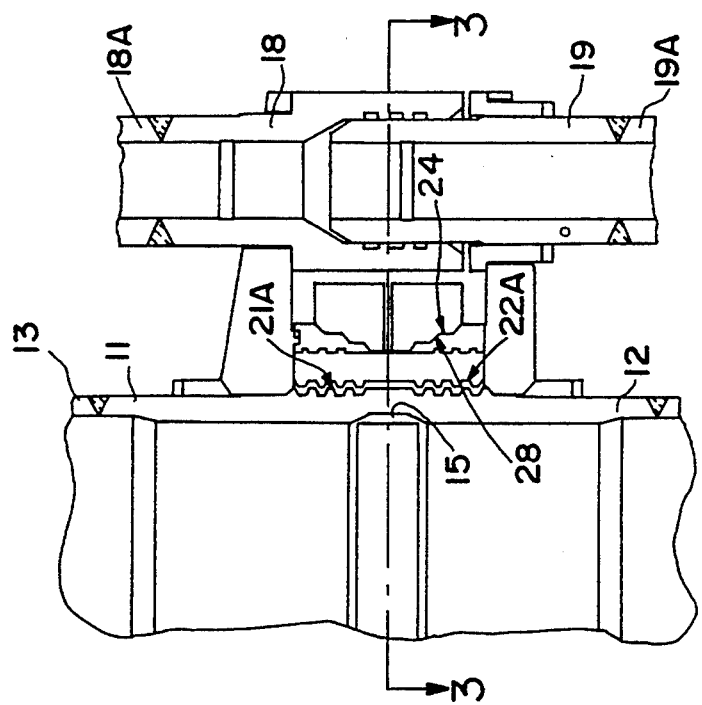
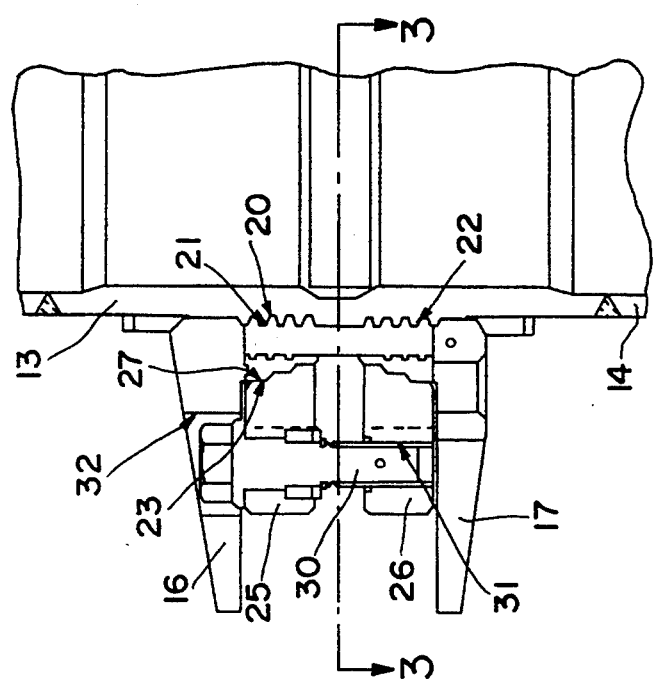

CONNECTOR WITH OPPOSITE MOVING CAM RINGS

This invention relates in general to a connector for releasably connecting tubular members in end-to-end relation; and, more particularly, to improvements in connectors of this type in which end surfaces on the members are urged into tight engagement with one another in order to preload the connection as it is made up. In one of its aspects, this invention relates to such a connector which is especially well-suited for releasably connecting the ends of riser pipes.

In the drilling or producing of an offshore well from a floating vessel, a riser extends between the vessel and the head of the well. This riser may be as long as several thousand feet, and is made up of successive riser pipes whose adjacent ends are connected on board the vessel, as the riser is lowered into position, or disconnected on board the vessel as the riser is raised. In any event, these connections must be easily and quickly made up or released, as the case may be. Still further, since the ends of pipe sections of the choke and/or kill line extending along the outside of the riser must be telescopically made up at the same time, the riser pipes must be connected without relative rotation of the riser pipes.

U.S. Pat. Nos. 4,491,346 and 4,496,172, both assigned to the assignee of the present application, disclose improved preloaded connectors of this type, with the connector of U.S. Pat. No. 4,491,346 being especially well-suited as a riser connector, and that of U.S. Pat. No. 4,496,172 being especially well-suited as a wellhead connector.

The connectors of these patents were improvements over the prior art connectors in several respects. Thus, for example, each was comprised of a relatively small number of parts which transmitted load from one tubular member to the other through a single locking part in the form of a split lock ring connected directly to each of the tubular members. Also, the load was transmitted from multiple load shoulders on one such member to multiple load shoulders on the other such member in a direct path and through a minimum number of parts, and the locking teeth and grooves on which the shoulders were formed were caused to move in a radial direction and thus to more uniformly distribute the load to each such shoulder.

Thus, as shown in these patents, each connector comprised first and second tubular members connected to the ends of adjacent riser pipes or wellhead members, as the case might be, and having respectively first and second locking grooves thereabout. A split lock ring having first and second axially spaced locking teeth on its inner side was carried by the first tubular member so that the second teeth could be moved past the end of the second tubular member to dispose the first and second teeth generally opposite the first and second grooves, respectively, as the members were moved into end-to-end relation, and contracted positions in which the first and second teeth were interlocked with the first and second grooves, the teeth having tapered surfaces thereon which were slidable over tapered surfaces of the grooves to urge end surfaces on said members into tight engagement with one another as the lock ring moves to contracted position. More particularly, a cam ring having one or more conically shaped cam surfaces about its inner side was carried for slidable engagement with conically shaped follower surfaces about the outer side of the lock ring, and a means was provided for moving the cam ring axially between a first position in which the lock ring is expanded and a second position in which the lock ring is contracted.

Although substantial improvements over the prior art connectors, these connectors require substantial structure for taking the reaction forces of actuators used to move the cam ring to one or both of its positions, and it is therefore the primary object of this invention to provide such a connector which is of simpler and light construction, and less costly, in that it does not require this additional structure.

For this purpose, and as shown in the illustrated and preferred embodiment of the invention, a pair of cam rings having first and second conically shaped cam surfaces about their inner side are disposed about the lock ring for slidable engagement with first and second axially spaced, conically shaped follower surfaces, respectively, about the outer side of the lock ring, and means are provided for moving the cam rings axially toward and away from one another between a first position in which the lock ring is expanded and a second position in which the lock ring is contracted. Consequently, the only reaction forces are those which are transmitted between the cam rings, so that there is no need for the additional support structure required in the prior connectors.

As illustrated, the cam and follower surfaces extend inwardly toward one another and the cam rings are axially spaced apart for movement toward one another from their first to their second positions in which the lock ring is contracted. Also, the lock ring is so formed as to normally assume its expanded position so that the cam surfaces of the cam rings slide over the follower surfaces on the lock ring to wedge the lock ring into its contracted position. In the preferred embodiment of the invention, the means for moving the cam rings toward and away from one another comprises circumferentially spaced bolts carried by one and threadedly engaging with the other of the cam rings.

As shown, the connector is a riser pipe connector wherein first and second tubular members are adapted to be connected to the end of adjacent riser pipes, a first support plate extends laterally of the first member, a second support plate extends laterally of the second member, and a pipe is mounted on each plate for telescopically interfitting with a pipe mounted on the other plate, upon movement of the members into end-to-end relation.

In the drawings, wherein like reference characters are used throughout to designate like parts:

FIGS. 2A and 2B are partial vertical sectional views of the left- and right-hand sides of the riser connector of FIG. 1, as seen along broken lines 2—2 of FIG. 4, and with the lock ring and cam rings shown in FIG. 2A in locked position of the riser, and in FIG. 2B in the released or unlocked position of the riser connector.

Figure 1:
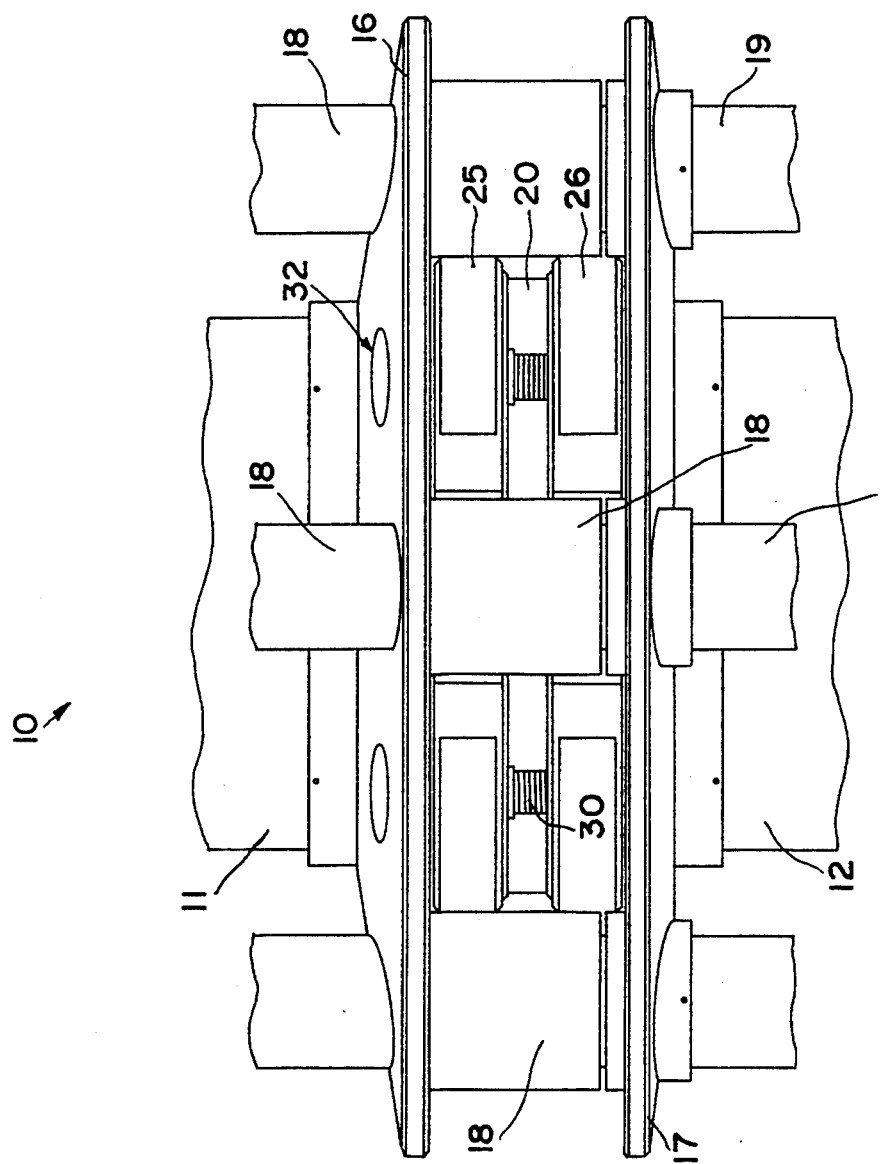
FIG. 1 is a side view of a riser connector constructed in accordance with the present invention.

With reference now to the details of the above described drawings, the connector shown therein, and designated in its entirety by reference character 10, includes first and second, or upper and lower, tubular members 11 and 12, respectively, which are connected, as by welding, to the ends of upper and lower riser pipes 13 and 14, respectively. More particularly, as shown in FIGS. 2A and 2B, the tubular members are adapted to be connected in end-to-end relation so as to in turn connect the riser pipes 13 and 14 in coaxial relation, and a seal ring 15 sealably engages between tapered surfaces at the adjacent ends of the tubular members to form a smooth continuation of the bore through the connector. More particularly, the seal ring may be carried by the upper tubular member 11 for lowering therewith into engagement with the lower tubular member, as will be described to follow.

A first or upper plate 16 is carried by the first or upper tubular member 11, and a second or lower plate 17 is carried by the second or lower tubular member 12. As shown, the plates extend outwardly from the tubular members so as to support the pipes 18 and 19 connected at the lower ends of the upper lines 18A and upper ends of the lower lines 19A. As best shown in FIG. 2B, the pipes are so supported as to move into sealed telescopic interfitting relationship as the tubular members of the connector are moved into end-to-end relation. As well-known in the art, one pair of interfitting pipes may connect adjacent sections of a kill line, and the other pair may connect adjacent sections of a choke line, while additional pairs of interfitting pipes may connect adjacent sections of other types of fluid lines.

As will be understood from the description to follow, a split lock ring 20 having upper and lower sets of teeth 21 and 22 formed about its upper and lower bore, respectively, is carried by the upper tubular member 11 for lowering therewith as well as radial movement with respect thereto. More particularly, the lock ring is carried for radial movement between an expanded position, as shown in FIG. 2B, in which the lower teeth thereon are free to move downwardly over the lower grooves about the tubular member 12, and the contracted position shown in FIG. 2A in which the teeth 21 and 22 are tightly engaged with matching grooves 21A and 22A on the tubular members 11 and 12. As previously described, the surfaces of the teeth and grooves are tapered so as to wedge the teeth tightly into the grooves as the locking ring is moved to locking position, and thus preload the riser connector by moving the ends of the tubular members axially toward one another. Obviously, when the lock ring is moved outwardly to the unlocking position shown in FIG. 2B, it enables the upper tubular member 11 and thus the remainder of the upper end of the connector to be removed from the lower end thereof.

In the illustrated embodiment of the invention, the lock ring is of such construction as to normally assume its expanded or unlocking position, so that it must be forced radially inwardly to the locking position shown in FIG. 2A. For this purpose, conical surfaces 23 and 24 formed about the upper and lower outer ends of the lock ring are so arranged as to be tapered toward one another. More particularly, these surfaces are surrounded by upper and lower cam rings 25 and 26, respectively, having similarly tapered surfaces 27 and 28 on their inner diameters for sliding over those of the lock ring so as to urge the lock ring inwardly to locking position, as the cam rings are moved away from one another, and to move the lock ring to the expanded unlocking position when the cam rings are moved toward one another, as shown in FIG. 2B.

As previously described, and as best shown in FIG. 2, the cam rings are adapted to be moved toward and away from one another by means of bolts 30 extending between them, with the upper ends of the bolts extending through and mounted on the upper cam ring 25 and the lower ends thereof connected to the lower cam ring by threads 31, whereby the bolts are supported by the lower cam ring and the upper cam ring is supported by the bolts. More particularly, the heads of the upper ends of the bolts extend within holes 32 in the plate 16 to permit them to be manipulated in order to move the lower cam ring upwardly or downwardly with respect to the upper cam ring.

Thus, for example, upon rotation of the bolts in a right-hand direction, the cam rings may be moved away from one another, so as to in turn cause the cam surfaces on their inner sides to slide over the cam follower surfaces on the lock ring to force the lock ring into the locking position. Alternatively, rotation of the bolts in a left-hand direction would cause the cam rings to move inwardly toward one another, as shown in FIG. 2B, thus causing the hollow surfaces on the cam ring to slide over the cam surfaces on the lock ring to permit the lock ring to expand outwardly to the unlocking position of FIG. 2A.

Obviously, in accordance with an alternative embodiment of the invention, the cam and follower surfaces could be reversed in direction—i.e., extend in directions radially away from one another—in which event the lock ring would be moved to locking position as the cam rings were moved toward one another, and permitted to move to open or disconnected position upon movement of the cam rings away from one another. It will also be understood that, although, as shown, the lock ring is of such construction as to normally assume its expanded position, it could be otherwise—i.e., normally assume its contracted engaging position, in which case the cam rings could be so connected to the locking ring as to wedge it outwardly toward disconnected position. These alternatives would be obvious from the descriptions in the foregoing U.S. Pat. Nos. 4,491,346 and 4,496,172.

In the illustrated embodiment of the invention, the pipes connected to the choke and kill lines are telescopingly made up with one another merely in response to lowering of the riser pipe connector into connected position. Thus, for example, the upper plate may be lowered with the choke and kill lines to permit the lower ends of the pipes 18 to slide vertically and telescopically thereover, and to seal with respect to the upper ends of the pipe 17. Thus, in the illustrated embodiment of the invention, the choke and kill lines are connected together by virtue of the connection of the upper and lower tubular members of the riser connector to one another.

Figure 3:
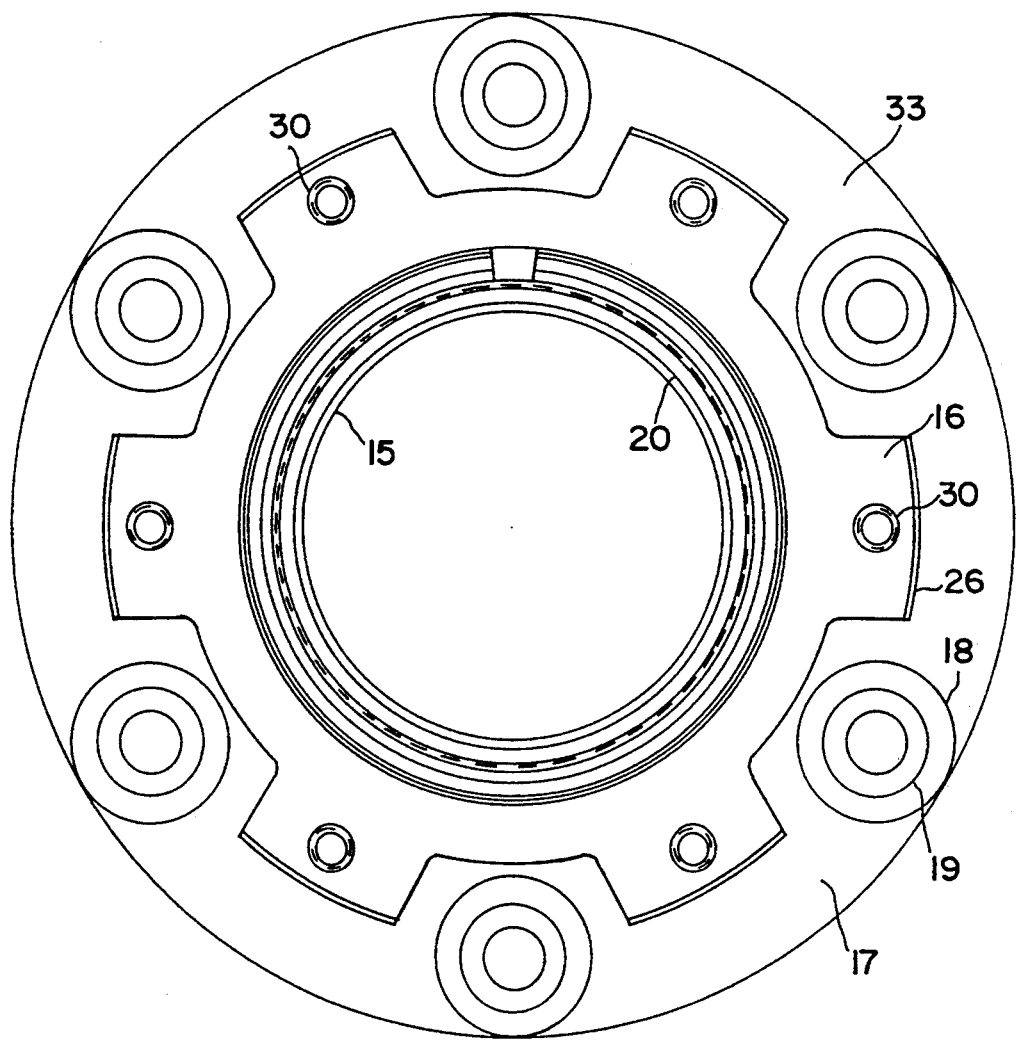
FIG. 3 is a horizontal sectional view of the riser connector, as seen along broken lines 3—3 of FIGS. 2A and 2B, with the lock ring and cams moved to positions to lock the tubular members together, as shown in FIG. 2B.
Figure 4:
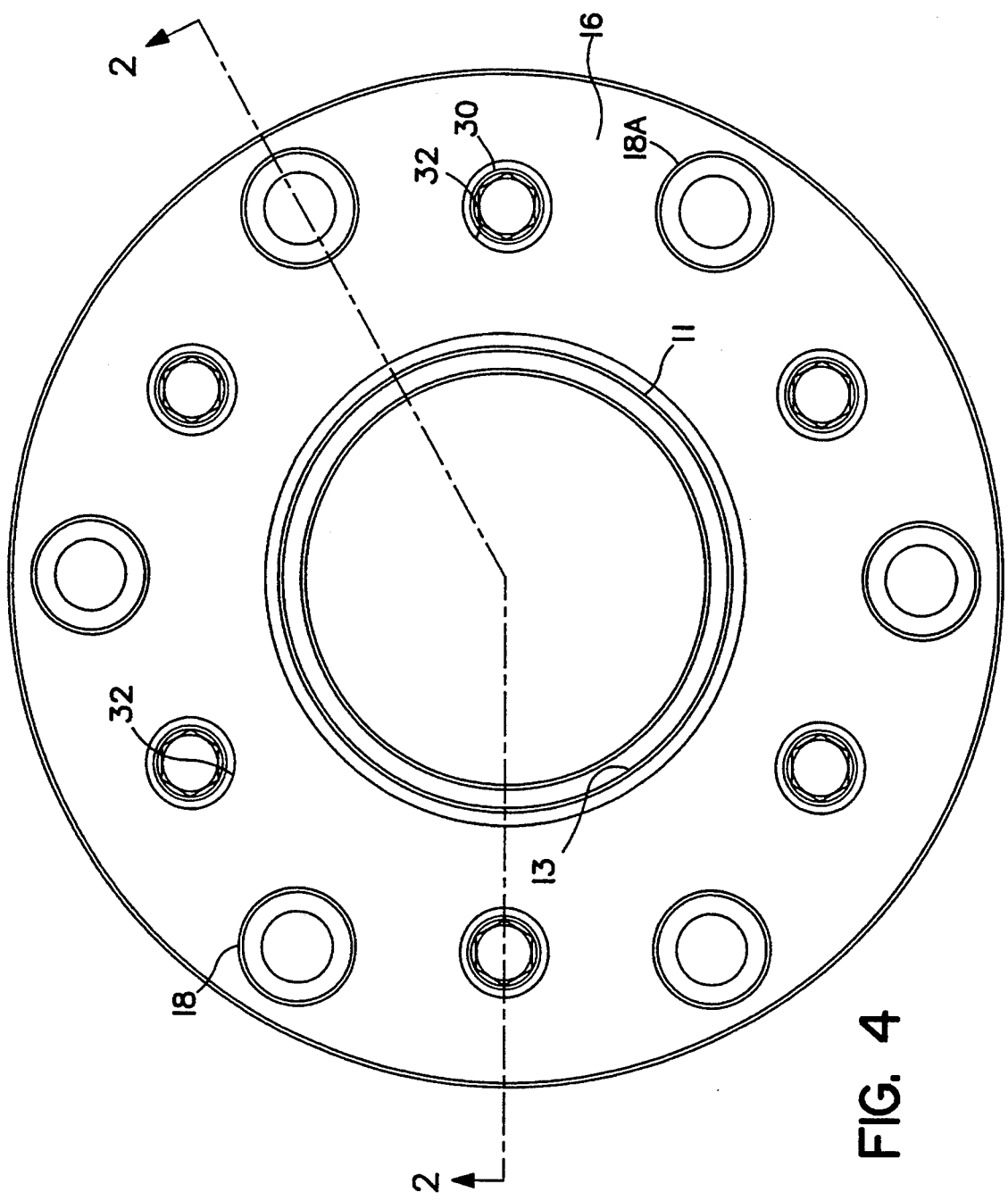
FIG. 4 is a top plan view of the connector.

As shown in FIGS. 1 and 3, the outer sides of the cam ring 26 are recessed as shown in 33 to receive the inner sides of the pipes 17 and 18, thus providing the over-all riser connector with minimum lateral dimensions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A connector comprising
a first tubular member having first locking grooves thereabout,
a second tubular member having second locking grooves thereabout, and
a split lock ring having first and second axially spaced locking teeth on the inner side thereof which are carried by the first tubular member for radial movement between expanded positions in which second teeth may be moved past the end of the second tubular member to dispose the first and second teeth opposite the first and second grooves, respectively, when said members are moved into end-to-end relation, and contracted positions in which the first and second teeth are interlocked with the first and second grooves, respectively,
said teeth having tapered surfaces thereon which are slidable over tapered surfaces of the grooves to urge the end surfaces on said members into tight engagement with one another as the lock ring moves to contracted position
a pair of cam rings having first and second conically shaped cam surfaces about their inner sides for slidable engagement with first and second axially spaced, conically shaped follower surfaces, respectively, about the outer side of the lock ring, and
means for moving the cam rings axially toward and away from one another between a first position in which the lock ring is expanded and a second position in which the lock ring is contracted.

2. As in claim 1, wherein
the lock ring is so formed as to normally assume its expanded position so that the cam surfaces of the cam rings slide over the follower surfaces on the lock ring to wedge the lock ring into its contracted position.

3. As in claim 1, wherein
the cam and follower surfaces extend inwardly toward one another and the cam rings are axially spaced apart for movement toward one another from their first to their second positions.

4. As in claim 2, wherein
the cam and follower surfaces extend inwardly toward one another and the cam rings are axially spaced apart for movement toward one another from their first to their second positions.

5. As in claim 1, wherein
the means for moving the cam rings toward and away from one another comprises circumferentially spaced bolts carried by one and threadedly engaging with the other of the cam rings.

6. A riser pipe connector, comprising
first and second tubular members each adapted to be connected to the end of a riser pipe,
a first support plate extending laterally of the first member,
a second support plate extending laterally of the second member,
a pipe mounted on each plate for telescopically interfitting with a pipe mounted on the other plate, upon movement of the members into end-to-end relation,
the first member having first locking grooves thereabout,
the second member having second locking grooves thereabout, and
a split lock ring having first and second axially spaced locking teeth on the inner side thereof which are carried by the first tubular member for radial movement between expanded positions in which the second teeth may be moved past the end of the second tubular member to dispose the first and second teeth opposite the first and second grooves, respectively, when said members are in end-to-end relation, and contracted positions in which the first and second teeth are interlocked with the first and second grooves, respectively,
said teeth having tapered surfaces thereon which are slidable over tapered surfaces of the grooves to urge the end surfaces on the members into tight engagement with one another as the lock ring moves to contracted position,
a pair of cam rings having first and second conically shaped cam surfaces about their inner sides for slidable engagement with first and second axially spaced, conically shaped follower surfaces, respectively, about the outer side of the lock ring, and
means for moving the cam rings axially toward and away from one another between a first position in which the lock ring is expanded and a second position in which the lock ring is contracted.

7. As in claim 6, wherein
the lock ring is so formed as to normally assume its expanded position so that the cam surfaces of the cam rings slide over the follower surfaces on the lock ring to wedge the lock ring into its contracted position.

8. As in claim 6, wherein
the cam and follower surfaces extend inwardly toward one another and the cam rings are axially spaced apart for movement toward one another from their first to their second positions.

9. As in claim 8, wherein
the cam and follower surfaces extend inwardly toward one another and the cam rings are axially spaced apart for movement toward one another from their first to their second positions.

10. As in claim 6, wherein
the means for moving the cam rings toward and away from one another comprises circumferentially spaced bolts carried by one and threadedly engaging with the other of the cam rings.

* * * * *

REEXAMINATION CERTIFICATE (3345th)

United States Patent [19]

Watkins

[11] B1 5,441,311
[45] Certificate Issued Oct. 7, 1997

[54] CONNECTOR WITH OPPOSITE MOVING CAM RINGS

[75] Inventor: Bruce J. Watkins, Houston, Tex.

[73] Assignee: Dril-Quip, Inc., Houston, Tex.

Reexamination Request:
No. 90/004,216, Mar. 14, 1996

Reexamination Certificate for:
Patent No.: 5,441,311
Issued: Aug. 15, 1995
Appl. No.: 269,550
Filed: Jul. 1, 1994

[51] Int. Cl.[6] .............. F16L 55/00; F16L 37/18; F16L 39/00
[52] U.S. Cl. .............. 285/18; 285/315; 285/341; 285/309; 285/321
[58] Field of Search .............. 285/18, 315, 341, 285/309, 322, 39, 419, 398, 373

[56] References Cited

U.S. PATENT DOCUMENTS 4,984,830   1/1991   Saunders.

*Primary Examiner*—Eric K. Nicholson

[57] ABSTRACT

There is disclosed a connector for releasably connecting tubular members connected to adjacent ends of riser pipes in end-to-end relation. The tubular members have locking grooves about their adjacent ends, and a split lock ring surrounds the adjacent ends of the tubular members, when in end-to-end relation, and has upper and lower teeth thereabout for fitting tightly within the grooves to hold the ends of the tubular members in end-to-end relation. The lock ring is moved between locking and unlocking positions by means of cam rings having tapered conical cam surfaces thereabout for slidable engagement with follower surfaces about the upper and lower ends of the lock ring.

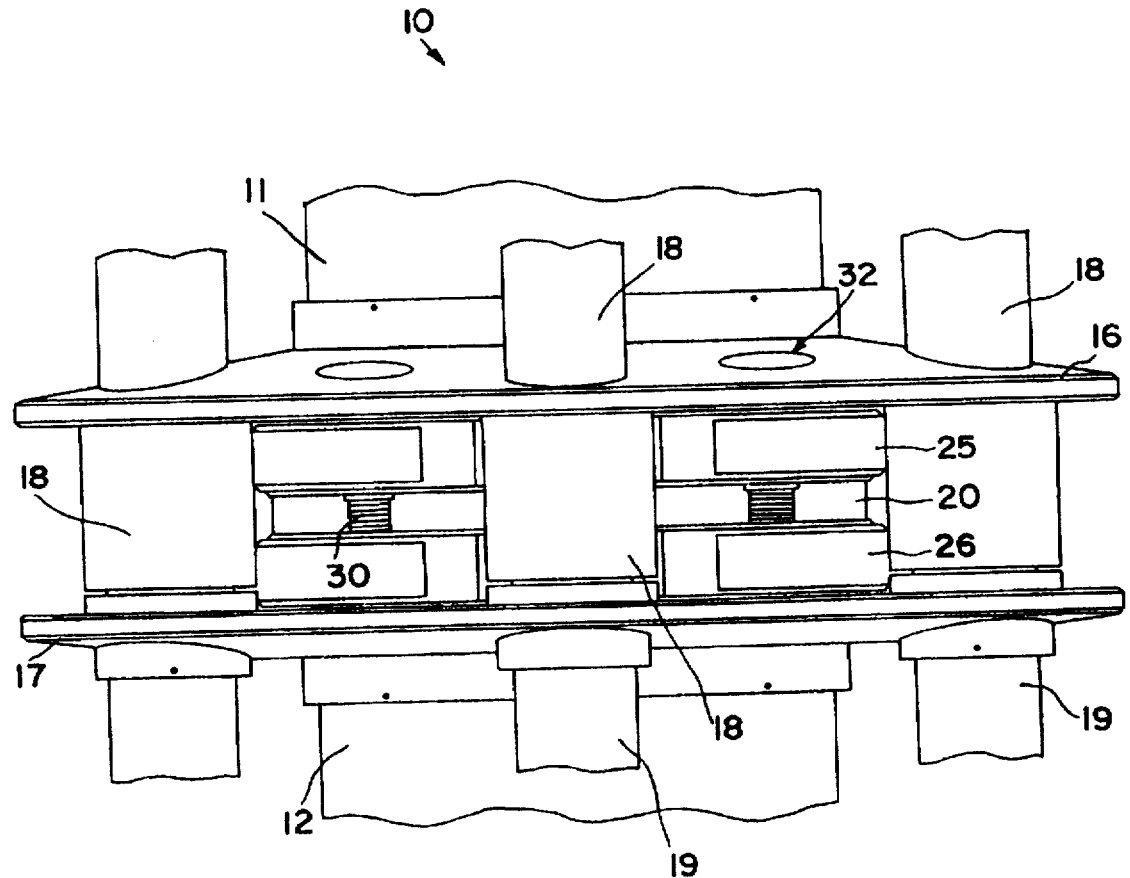

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, 5, 7, 9 and 10 are cancelled.

Claims 1, 3, 6 and 8 are determined to be patentable as amended.

New claims 11 and 12 are added and determined to be patentable.

1. A connector comprising a first tubular member having first locking grooves thereabout, a second tubular member having second locking grooves thereabout, and a [split] lock ring [having] *which is split at only one location about its circumference and which has* first and second axially spaced locking teeth on the inner side thereof *and first and second axially spaced, conically shaped follower surfaces about the outer side thereof, which extend circumferentially from substantially one end to the other of the split, and* which are carried by the first tubular member for radial movement between *normally assumed,* expanded positions in which second teeth may be moved past the end of the second tubular member to dispose the first and second teeth opposite the first and second grooves, respectively, when said members are moved into end-to-end relation, and contracted positions in which the first and second teeth are [interlocked] *forced into locking engagement* with the first and second grooves, respectively, said teeth having tapered surfaces thereon which are slidable over tapered surfaces of the grooves to urge the end surfaces on said members into tight engagement with one another as the lock ring moves to contracted position, a pair of cam rings having first and second conically shaped cam surfaces about their inner sides for slidable engagement with [first and second axially spaced, conically shaped follower surfaces, respectively, about the outer side of the lock ring] *said follower surfaces about the lock ring,* and means for moving the cam rings axially toward and away from one another between a first position in which the lock ring is expanded and a second position in which the lock ring is contracted.

3. As in claim [1] *11,* wherein the cam and follower surfaces extend inwardly toward one another and the cam rings are axially spaced apart for movement toward one another from their first to their second positions, *whereby*

*the bolts transmit a compressive force in moving the cam rings to their second position.*

6. A riser pipe connector, comprising first and second tubular members each adapted to be connected to the end of a riser pipe, a first support plate extending laterally of the first member, a second support plate extending laterally of the second member, a pipe mounted on each plate for telescopically interfitting with a pipe mounted on the other plate, upon movement of the members into end-to-end relation, the first member having first locking grooves thereabout, the second member having second locking grooves thereabout, and a [split] lock ring [having] *which is split at only one location about its circumference and which has* first and second axially spaced locking teeth on the inner side thereof *and first and second axially spaced, conically shaped follower surfaces about the outer side, which extend circumferentially from substantially one end to the other of the split, and* which are carried by the first tubular member for radial movement between *normally assumed,* expanded positions in which the second teeth may be moved past the end of the second tubular member to dispose the first and second teeth opposite the first and second grooves, respectively, when said members are in end-to-end relation, and contracted positions in which the first and second teeth are [interlocked] *forced into locking engagement* with the first and second grooves, respectively, said teeth having tapered surfaces thereon which are slidable over tapered surfaces of the grooves to urge the end surfaces on the members into tight engagement with one another as the lock ring moves to contracted position, a pair of cam rings having first and second conically shaped cam surfaces about their inner sides for slidable engagement with [first and second axially spaced, conically shaped follower surfaces, respectively, about the outer side of the lock ring] *said follower surfaces about the lock ring,* and means for moving the cam rings axially toward and away from one another between a first position in which the lock ring is expanded and a second position in which the lock ring is contracted.

8. As in claim [6] *12,* wherein the cam and follower surfaces extend inwardly toward one another and the cam rings are axially spaced apart for movement toward one another from their first to their second positions, *whereby*

*the bolts transmit a compressive force in moving the cam rings to their second position.*

*11. As in claim 1, wherein*

*the means for moving the cam rings toward and away from one another includes bolts each having one end threadedly connected to one of the cam rings, and*

*the other end of each bolt is mounted on and supports the other ring so that rotation of the bolt in one direction moves the cam rings apart and rotation in the other direction pulls them together.*

*12. As in claim 6, wherein*

*the means for moving the cam rings toward and away from one another includes bolts each having one end threadedly connected to one of the cam rings, and*

*the other end of each bolt is mounted on and supports the other ring so that rotation of the bolt in one direction moves the cam rings apart and rotation in the other direction pulls them together.*

\* \* \* \* \*